United States Patent [19]

Lowe

[11] Patent Number: 5,237,755
[45] Date of Patent: Aug. 24, 1993

[54] RAPID DRYING OF POLYAMIDE RESINS USING HIGH FREQUENCY ELECTRIC FIELDS

[75] Inventor: David J. Lowe, Wilmington, Del.

[73] Assignee: E. I. Du Pont de Nemours and Company, Wilmington, Del.

[21] Appl. No.: 805,148

[22] Filed: Dec. 11, 1991

[51] Int. Cl.$^5$ .............................................. F26B 3/347
[52] U.S. Cl. .......................................... 34/1 K; 34/30
[58] Field of Search ................ 34/1 R, 1 A, 1 K, 1 E, 34/30; 281/21.1; 219/10.57, 10.63

[56] References Cited

U.S. PATENT DOCUMENTS

| | | | |
|---|---|---|---|
| 3,964,769 | 6/1976 | Shatzkin | 281/21.1 |
| 4,254,253 | 3/1981 | Brent, Jr. et al. | 528/272 |
| 4,546,226 | 10/1985 | Trembley et al. | 219/10.81 |

*Primary Examiner*—Henry A. Bennet

[57] ABSTRACT

A process for quickly drying thermoplastic polyamide resin by the use of a high frequency electric field. The process comprises placing the polyamide between at least two electrodes, applying a high frequency voltage to the electrodes to produce a heating rate of the polyamide between 0.5° C. and 50° C./min, and then removing the water evolved from the polyamide.

14 Claims, No Drawings

RAPID DRYING OF POLYAMIDE RESINS USING HIGH FREQUENCY ELECTRIC FIELDS

TECHNICAL FIELD

This invention relates to an improvement in the drying and moisture control of thermoplastic polyamide resins prior to subsequent processing, such as molding or extrusion. More specifically, this invention relates to a process for quickly removing moisture from thermoplastic polyamide resins by increasing the water diffusion rate within the resin by using high frequency electric fields.

BACKGROUND OF THE INVENTION

Conventional circulating hot gas dryers, hereinafter conventional dryers, are used to dry various polymers. Some disadvantages of these conventional dryers are (1) long residence times in order to dry the polymers, (2) the use of large vessels to hold the polymer which is being dried, (3) the use of large flows of hot, dry gas, (4) large amounts of energy to run the blower in order to move the gases within the system, and (5) difficulty in controlling moisture of the discharged polymer at the discharge to a fixed moisture level.

More specifically, conventional dryers require long residence times for polyamide resins, because the dryers are usually operated at low temperatures in order to minimize yellowing of the polyamide. Thus, because the temperature is low, usually less than 100° C., a longer residence time is required. This residence time can approach several hours. Moreover, because conventional dryers have long residence times, a large vessel is required to hold the polymer. These large vessels are needed because as the polymer is being dried, which requires a significant amount of time, a vessel is needed to contain the polymer while drying occurs. A large facility is required to house the large vessel.

Furthermore, conventional dryers usually heat the polymer up to the drying temperature by means of a large volume of heated gas flowing through the polymer. Thus, a large flow of hot, dry gas is needed to flow through the vapor space around the polymer. Consequently, large systems to move the gas within the system, i.e. a blower, are needed, thus, more energy is used, approximately 130–150 kW for a 2274 kg/hr dryer, to run the blower to generate this flow.

Lastly, conventional dryers, due to their long residence time, are difficult to control in such a way that the discharge moisture is maintained at a fixed value. Specifically, changes made to the dryers during the operation of a process take a long time to materialize due to the amount of time the polymer is in the dryer. For example, if a change is made in the processing system, full effects of that change will not show up in some cases for up to 24 hours.

The present invention solves the problems of conventional dryers by using high frequency electric fields to dry polyamides with low temperatures, short times, and less investment to achieve a high quality polyamide resin with low moisture.

In particular, the process of the present invention can dry thermoplastic polyamide resins very quickly, in less than 15 minutes, with no increase in yellowness. The drying for polyamides can be achieved at low temperatures. In general, high frequency electric fields speed up the diffusion of water in the polyamide resins by disrupting the hydrogen bonds between the water and the amide links. This allows the water to diffuse out of the polyamide resins very quickly, consequently significantly reducing the residence time. In addition, minimizing the exposure of polyamide resin to oxygen during the drying process, at the reduced residence time and low temperature eliminates or minimizes the increase in yellowness during drying. Moreover, due to the short residence times a small vessel is used to the hold the thermoplastic polyamide resin; thus, less space is required to house the process of the present invention. In addition, heating with high frequency electric fields eliminates the need for large flows of hot, dry gas. More specifically, high frequency electric fields heat the polyamide resin directly; therefore an inert gas is used only to take the water away from the polyamide resin. Thus, there is less gas flow per unit volume of polymer. Furthermore, as a result of the direct heating of the polyamide resin less energy is used with the process of the present invention to circulate the gas. More specifically, due the shallow bed of the polyamide resin (resulting from the short residence time) and the very low flow of the gas, approximately 7.5 kW for a 2275 kg/hr dryer to run the blower, a lot less energy is required for high frequency electric field drying than for conventional dryers.

High frequency electric field drying is easier to control than conventional drying to a fixed polymer discharge moisture due to the short residence time. More specifically, full effect of changes made in the process of the present invention can be seen in less than 15 minutes.

It is known in the art that polyamides may be dried by the use of microwaves. Polyamide dryers using microwaves are prone to hot spots because the microwave wavelength is usually smaller than the size of the cavity in which the resin is being heated. Due to the presence of unavoidable standing waves in microwave cavities, there are areas in those cavities with peaks and valleys in the level of electric field. Various methods are included to attempt to minimize these variations in heating of polyamide resin, such as 'mode stirrers' to continuously vary the location of these field variations, and such as mechanically agitators to continuously move the resin. These methods are not altogether effective, as the mode stirrer cannot create truly uniform heating due to the repeating pattern of the rotating vanes or antennas from the microwave source, and mechanical agitation causes abrasion in the resin which then creates fines and dust.

By contrast, the high frequency electrical energy in the present invention has a wavelength which is longer than the thickness of the bed of resin being processed, and is typically longer than even one axis of the electrode structure, such as the width; thus, the electric fields established by that energy and the heating produced by such fields are more uniform than that of microwaves. More specifically, the wavelength of a 2450 MHz microwave is about 11 cm, as compared to 4 meters for a 75 MHz high frequency electrical energy.

Moreover, microwave radiation is limited in penetration depth in high dielectric loss materials, and is thus attenuated as it enters a large volume of polyamide resin, resulting in lower heating rates in the interior. This limits the size of microwave dryers to batches of materials which are smaller than the capability of the present invention. Optimally, the high frequency electric field is perpendicular to the thickness of resin, and all materials is exposed to the same voltage gradient through the depth of the bed from hot electrode to ground electrode.

In addition, for commercial scale operation, microwave dryers for polyamide resins require residence times of about 90 minutes. Although, this is a shorter residence time than required by conventional dryers, it is still a long residence time.

SUMMARY OF THE INVENTION

The time and cost for drying thermoplastic polyamide resins can be reduced by the use of high frequency electric fields. More specifically, the present invention utilizes a process for quickly drying thermoplastic polyamide resins comprising the steps of:
   a) placing a thermoplastic polyamide resins between at least two electrodes;
   b) arranging the electrodes and applying a high frequency voltage to the electrodes to create a high frequency electric field to provide a heating rate of the polyamide resins is between 0.5° C./min and 50° C./min;
   c) removing water evolved from the heated polyamide.

Alternatively, the cost and time for drying thermoplastic polyamides resins can be reduced using the above-mentioned processes, but starting with the polyamide resins at a temperature between 60° C. and 150° C.; however the heating rate of the polyamide would then be less than 0.5° C./min.

In either alternative the quality of the resultant polyamide, especially the yellowness of the polyamide, can be further improved by excluding oxygen from the gas(es) around the polyamide resins during drying, and minimizing the exposure of the starting material to oxygen before drying.

DETAILED DESCRIPTION OF THE INVENTION

The present invention employs thermoplstic polyamide resins. Such polyamide resins are well known in the art and embrace those semi-crystalline and amorphous resins having a molecular weight of at least 5000 and commonly referred to as nylons. Suitable polyamide resins include those polyamide resins described in U.S. Pat. No. 4,174,358, which is incorporated herein by reference. The polyamide resins can be produced by condensation of equimolar amounts of a dicarboxylic acid containing form 4 to 12 carbon atoms with a diamine, in which the diamine contains from 4 to 14 carbons atoms. Excess diamine can be employed to provide an excess of amines end groups over carboxyl end groups in the polyamide. Preferred polyamide resins include poly(hexamethylene adipamide), poly(caprolactam), poly(hexamethylene dodecanoamide), and copolymers of poly(hexamethylene isophthalamide) and poly(hexamethylene terephthalamide). The most preferred polyamide is poly(hexamethylene adipamide).

The process of the present invention quickly dries thermoplastic polyamide resins. The term "quickly drying" is defined as a drying in which the polyamide has a residence time of less than 15 minutes. The residence time is the time the polyamide resin is exposed to the high frequency electric field. The 15 minute residence time depends on various factors, the most important being the starting and final temperatures of the polyamide resins, i.e. before drying and after drying, and the starting and final moisture levels of the polyamide resin.

Preferably the process of the present invention will have a residence time of less than 12 minutes, and most preferably less than 9 minutes.

The rate at which the polyamide is dried affects the residence time of the process. The rate of drying of polyamide resins is increased by maintaining the polyamide resin in a high frequency electric field. The high frequency electric field increases the diffusivity of water in the polyamide resins, thus, enabling the resins to be dried in significantly less time at lower temperatures than would be required by driers that circulate hot, dry gas around the polyamide resin. Moreover, excluding oxygen from the space around the polyamide resin in conjunction with the lower temperatures and shorter processing times allows the polyamide resins to be dried without increasing the yellowness of the polyamide resin.

The drying of the polyamide resin is accomplished by
1) placing the polyamide resin to be dried between at least two electrodes;
2) arranging the electrodes and applying a high frequency voltage to those electrodes so that the heating rate of the polyamide resin is preferably between 0.5° C./minute and 50° C./minute, more preferably between 0.5° C./minute and 25° C./minute, and most preferably between 2° C./minute and 10° C./minute; and
3) withdrawing the water evolved from the polyamide resin from the space around the polyamide resin.

Alternatively, the polyamide resin can be at or near the maximum desired operating temperature, and thus, drying is accomplished by
1) placing the polyamide resin to be dried between at least two electrodes;
2) arranging the electrodes and applying a high frequency voltage to those electrodes so that the heating rate of the polyamide resin is less than 0.5° C./minute; and
3) withdrawing the water evolved from the polyamide resin from the space around the polyamide resin.

The arrangement of the electrodes to achieve such a desired heating rate of the polyamide resin can vary. Some examples of these arrangements are (1) flat parallel plates, (2) plates contoured to the shape of the bed of polyamide resin in such a way as to maximize the uniformity of the high frequency electric field strength in the polyamide resin being dried, and (3) cylindrical coaxial electrodes. More specifically, polyamide resins used for injecting molding, extrusion or fiber spinning are typically small pellets. Flat plate electrodes are the preferred electrode design for beds of such pellets. Electrodes contoured to the shape of the bed of pellets in such a way as to minimize the variation in field strength in the polyamide resin are most preferred.

A high frequency voltage is applied to the electrodes to create the high frequency electric field to heat the polyamide resin. The frequency of the electric field should preferably be between 0.8 and 200 MHz, more preferably between 10 and 100 MHz, and most preferably between 10 and 70 MHz. It is not necessary in the process of this invention that the high frequency voltage applied to the electrodes in a continuous fashion. The high frequency voltage can be pulsed on and off or varied in voltage or frequency or both voltage and frequency. The preferred method is to apply the high frequency energy continuously without intentionally varying the frequency or voltage.

If the polyamide resin is already close to the maximum desired temperature for drying, the drying rate can be enhanced by arranging the electrodes, the voltage of the high frequency energy, the frequency of the high frequency electrical energy, or the polyamide resin or some combination of those variables so that the heating rate of said polyamide resin is less than 0.5° C./min.

Two basic processes can be used for this invention in drying polyamide resin.

1) The temperature can be increased at a rate that maximizes the diffusion of water within the polyamide resin and thus maximizes the drying rate, or
2) Once the polyamide resin is at or near the maximum desired operating temperature from dryin using process 1) above, or if it is at or near the maximum desired operating temperature when it is introduced to the process, the drying rate can be increased by maintaining the polymer in a high frequency electric field so that the heating rate is less than 0.5° C./minute. The heating rate from the high frequency electrical energy can be just enough to offset the heat loss to the purge gas and the environment by convection, conduction and radiation so that the temperature of the polyamide resin does not change appreciably.

Water must be removed from the vapor space around the polyamide. This water evolved from the polyamide resin during drying must be withdrawn from the vapor space around the polyamide resin. This can be done, for example, by purging the space around the polyamide resin with a dry gas, by using a vacuum, a combination of purge and vacuum, or by condensing the water in the vapor space on a cold surface. The most preferred route is to purge the space around the polyamide resin with a dry gas. The water removal can be done in a continuous or semi-batch fashion. The continuous method is preferred.

The flow and dewpoint of the purge gas required depends upon the starting moisture content of the polyamide resin and the desired final moisture content. More specifically, for a given starting moisture the final moisture can be controlled by varying the flow and dewpoint of the purge gas. Although it is not necessary for the operation of the invention to reduce the amount of purge gas required, it is preferred that the dewpoint of the purge gas be below $-20°$ C.

The volume of purge gas required depends heavily upon the starting moisture content of the polyamide resin and the desired final moisture content. For example, if it is desired to reduce the moisture content of a polyamide resin from 0.3% to 0.1%, the preferred flow of a $-20°$ C. dewpoint purge gas is greater than 20 liters/minute per kilogram of polyamide resin being dried.

In those instances where it is desired to minimize the increase in yellowness, the purge gas should be at least one inert gases, carbon dioxide, or mixtures thereof. Nitrogen is the most preferred inert gas.

In those instances where it is desired to further minimize the increase in yellowness during drying, the exposure of the polyamide resin to oxygen prior to drying should be minimized. This minimizes the free oxygen content of the polyamide resin thus further minimizing the yellowness increase during drying. This can be done, for example, by storing and transporting the polyamide resin under a vacuum or under a gas with a low oxygen content. The preferred way is to store and transport the polyamide under nitrogen.

This invention can be implemented as a continuous, semibatch, or batch type process. A continuous process is preferred for large scale operation ($>100$ kg/hr) to minimize cost and to maintain uniform quality.

By arranging the electrodes in a fashion so that the length in the feed direction is greater than the width, and the width is shorter than, for instance, one eighth of a wavelength of the high frequency electric field, longer heating residence time is made possible. As the feed direction in the drying chamber may approach or exceed one wavelength of the high frequency electric field, standing wave effects may appear. Techniques know to those skilled in the arts, such as "stubbing" the electrode structures with shunt inductive components, can be applied to greatly reduce the variation in electric field in both the width and more importantly, the length of the electrode structure. The effects that residual voltage variation in the of the electrode have on the overall eficiency and uniformity of the energy are counteracted by moving the bed of polyamide resin through the chamber in this feed direction.

In general, the process of the present invention typically involves placing a polyamide resin in a sample holder fabricated from a material which has a low dielectric loss such as fused silica, polyethylene, or PTFE polytetrafluoroethylene. However, it should be noted that if the process is run in a continuous fashion, typically a sample holder is not required, and one can contour the shape of the electrodes in order to maximize the uniformity of heating in the polyamide resin. If color is a factor, i.e. yellowness, the sample holder is first purged with an inert gas, such as nitrogen, before the sample is heated. Moreover, the inert gas would be maintained through the sample holder until the temperature of the polyamide is below 50° C. Nevertheless, whether color is a factor or not, the sample holder can be placed between at least two electrodes and a high frequency voltage can be applied to produce a high frequency electric field between the electrodes in such a way as to control the heating rate between 0.5° C./min and 50° C./min.

The resultant polyamide resin is then removed from the electrodes and the moisture of the polyamide resin is measured. The moisture may be measured by any known means, for instance, by a Karl Fischer titration, near infra-red spectrophotometry, or by analysis of the dielectric properties of the polyamide resin.

In the examples below the moisture of the resultant polyamide resins was measured by using a Mitsubishi Analyzer, Model CA-O5 with a solid sample furnace attachment, Model VA-O5, which is the Karl Fischer Titration. The oven temperature used for this titration was 235° C. In the Examples below the moisture content of the resultant polyamide is compared to the moisture content of the starting material.

In addition, if low color is desired, the resultant polyamide resin can be measured for yellowness index by ASTM D-1925. Generally, the increase in the yellowness index resulting from the starting polyamide resin and the resultant polyamide resin is between 0-5 units, preferably less than 2 units, and most preferred less than ½ unit.

EXAMPLE 1

This example demonstrates the process of the present invention wherein the color of the resultant polyamide is a factor. Thus, the sample is purged with nitrogen and the yellowness index is measured. This example is performed in a batch mode.

150 grams of poly(hexamethylene adipamide), usually referred to as nylon 66, is charged into a sample holder. The sample holder is a 15.24 cm long by 10.16 cm wide by 3.81 cm high rectangular box fabricated from PTFE. The sides and bottom are approximately 6.5 mm thick. The sample holder has a 3.3 mm thick solid removable lid to facilitate loading the sample. The sample holder has four 6.4 mm (¼") tubing ports. Two ports are centered on the short sides and are used for the introduction and exit of purge nitrogen. The remaining two ports are for non-metallic fiber optic temperature probes for a Luxtron model 750 temperature sensor. These ports are centered vertically and evenly spaced horizontally on one of the long sides. The temperature probes are inserted and arranged so that the end of each probe is near the middle of the bed of polyamide resin and is at or near the long axis of the sample holder.

The sample holder was closed and the nitrogen exit port was connected to a bubbler. The bubbler insures that there is a slight positive pressure of nitrogen within the sample holder. The sample holder was purged with 3 l/min of dry nitrogen for 20 minutes.

The sample holder was then placed in a dielectric heater between the two electrodes. The heater was a model EO-1 dielectric heater manufactured by W. T. LaRose & Associates, Inc., Troy, N.Y. with modifications to the control circuitry. The model EO-1 is a 500 Watt heater with flat plate electrodes that operates between 65 and 70 MHz. The top electrode is movable and can be positioned anywhere from 1.9 cm to 10.16 cm above the bottom electrode.

The control circuitry was modified by adding a proportionalintegral controller that cycles the oscillator in the EO-1 on and off to maintain the polyamide temperature, as determined by the Luxtron temperature sensor, at a selected value.

The nitrogen purge was maintained and the dielectric heater was turned on and operated under the following conditions:

The data obtained from with the heater was as follows:

| Time (min:sec) | Temp (°C.) | Electrode position (cm) |
| --- | --- | --- |
| 0:30 | 41.4 | 4.45 |
| 1:40 | 60.1 | 4.45 |
| 2:00 | 76.6 | increased to 10.16 |
| 2:10 | 78.8 | 10.16 |
| 2:40 | 80 | 10.16 |
| 3:00* | 80.8 | 10.16 |
| 3:50 | 81.8 | 10.16 |
| 4:50 | 83.4 | 10.16 |
| 5:50 | 83.7 | 10.16 |
| 6:20 | 84 | 10.16 |
| 6:50 | 84.6 | 10.16 |
| 7:40 | 86.5 | 8.25 |
| 8:10 | 88.2 | 8.25 |
| 8:40 | 89.9 | 8.25 |
| 9:00 | 90.9 | 8.25 |
| 9:20 | 90.9 | 8.25 |
| 9:50 | 90.9 | 8.25 |
| 10:10 | 90.5 | 8.25 |
| 10:20 | 90.5 | 8.25 |
| 10:50 | 90.5 | 8.25 |
| 11:30 | 90.3 | 8.25 |

*After 3 minutes the oven was cycled on and off by a controller to maintain temperature.

The nitrogen purge was maintained to cool the pellets to 46° C. before removing the pellets from the sample holder. Analysis of the starting material and product of the experiment show:

|  | % water | Yellowness Index per ASTM D1925 |
| --- | --- | --- |
| Starting material | 0.1135 | −0.66 |
| Resultant material | 0.0514 | −0.67 |

The results in Example 1 show essentially no increase in yellowness, namely 0.01, and a resultant moisture content of 0.0514.

EXAMPLE 2

In this example, color was not a factor; thus, the process was not purged with a inert gas.

890 kg/hr of poly(hexamethylene adipamide) was fed in a continuous fashion into a continuous dielectric heater. The heater consisted of four equally sized moveable "hot" electrodes positioned above a continuous conveyor belt which was supported underneath by the grounded electrode. The term "hot" electrodes implies that the electrode was not grounded to the low potential connection, but was connected to the high potential energized portion of the high frequency oscillator circuit. Conversely, the term "grounded" electrode implies that the electrode is connected, or grounded, to the low potential common connection of the high frequency oscillator circuit. This was the actual outer wall of the dying chamber, in this embodiment. The continuous conveyor belt was composed of a high temperature, low dielectric loss fabric so that negligible heating occur inside of the belt. Dielectric heaters of this general design are in commercial use for drying textile bobbins. The heater was operated at about 39 MHz.

The depth of the bed of pellets was varied between 10.16 cm and 9.67 cm during the experiment. The speed of the conveyor belt was about 41.5 cm/min. The total residence time of the polyamide under the four electrodes was 5.1 minutes. Water was removed from the dryer by applying a slight vacuum at the discharge of the dryer to pull ambient air through the dryer. The dewpoint of the ambient air was estimated to be about 0° C.

The electrodes were positioned and high frequency electrical energy was applied to each electrode in such a way as to produce the following estimated electric fields and heating rates within the polyamide.

| Electrode # | Estimated RMS Field Strength in the resin, volts/m (Root Mean Square) | Estimated heating rate, °C./min |
| --- | --- | --- |
| 1 | 39000 | 23.0 |
| 2 | 28000 | 11.7 |
| 3 | 24000 | 8.5 |
| 4 | 24000 | 8.5 |

The polyamide resin started with was about 20° C. and 0.208% water. At the heater exit the temperature of the resins ranged between 81.5° C. and 92.6° C., and had an average water content 0.11%.

EXAMPLE 3

In this example, 2275 kg/hr of poly(hexamethylene adipamide) is fed in a continuous fashion into a continuous dielectric heater. The heater consists of four equally sized, moveable "hot" electrodes positioned above a continuous conveyor belt which is supported underneath by the grounded electrode. The depth of the bed of the resin on the conveyor belt is 10 cm.

The electrodes are positioned and a high frequency voltage is applied to each electrode in such a way as to maintain an uniform field of approximately 18000 to 19000 volts/m in the polyamide resins so as to heat the resins at a nearly constant heating rate from the inlet to the discharge of the heater. The total residence time under the four electrodes is 8 minutes. The yellowness of the polymer does not increase more than ½ unit during the process.

The bed is purged uniformly with 9540 1/min of nitrogen with of dewpoint −21° C.

Conditions at the heater's entrance and discharge are as follows:

| Process Variables | Heater Entrance | Heater Discharge |
|---|---|---|
| Resin Temperature, °C. | 50 | 88 |
| Resin Moisture, % | 0.35 | 0.08 |

The polyamide resin started with is about 50° C. and 0.35% water. At the heater exit, the temperature of the resins is 88° C., and has an moisture content of 0.08%

I claim:

1. A process for drying a thermoplastic polyamide resin by the use of high frequency electric field comprising the steps of:
   a) placing the thermoplastic polyamide resin between at least two electrodes;
   b) arranging the electrodes and applying a high frequency voltage to the electrodes to create the high frequency electric field to provide the heating rate of the polyamide resin between 0.5° C./min and 50° C./min; and
   c) removing water evolved from the heated polyamide.

2. The process of claim 1 wherein the polyamide is poly(hexamethylene adipamide), poly(caprolactam), poly(hexamethylene dodecanoamide), copolymers of poly(hexamethylene isophthalamide), and poly(hexamethylene terephthalamide).

3. The process of claim 2 wherein the polyamide is poly(hexamethylene adipamide).

4. The process of claim 1 wherein the high frequency electric field has a frequency between 0.8 to 200 MHz.

5. The process of claim 4 wherein the frequency is between 10–70 MHz.

6. The process of claim 1 wherein the heating rate is between 0.5° and 25° C./min.

7. The process of claim 6 wherein the heating rate is between 2° and 10° C./min.

8. A process for drying a thermoplastic polyamide resin by the use of high frequency electric field comprising the steps of:
   a) removing oxygen from gases around the thermoplastic polyamide resin;
   b) placing the thermoplastic polyamide resin between at least two electrodes;
   c) arranging the electrodes and applying a high frequency voltage to the electrodes to create the high frequency electric field to provide the heating rate of the polyamide resin between 0.5° C./min and 50° C./min; and
   d) removing water evolved from the heated polyamide.

9. The process of claim 8 wherein the polyamide dried by the process has an increase in yellowness index of less than 5 units.

10. The process of claim 9 wherein the increase in yellowness index is less than 2 units.

11. The process of claim 10 wherein the increase in yellowness index is less than ½ unit.

12. The process of claim 7 wherein the oxygen is removed by sweeping the polyamide with an inert gas.

13. The process of claim 12 wherein the inert gas is nitrogen.

14. A process for drying a thermoplastic polyamide resin by the use of high frequency electric field comprising the steps of:
   a) placing the polyamide resin at a room temperature between 60° and 150° C. between at least two electrodes;
   b) arranging the electrodes and applying a high frequency voltage to the electrodes to create the high frequency electric field to provide the heating rate of the polyamide resin between 0.5° C./min and 50° C./min; and
   c) removing water evolved from the heated polyamide.

* * * * *